UNITED STATES PATENT OFFICE.

WILLIAM A. SMITH, OF CLEVELAND, OHIO.

METHOD OF PRODUCING VARNISH-OILS.

SPECIFICATION forming part of Letters Patent No. 708,178, dated September 2, 1902.

Application filed October 23, 1901. Serial No. 79,652. (No specimens.)

*To all whom it may concern:*

Be it known that I, WILLIAM A. SMITH, a citizen of the United States, and a resident of Cleveland, county of Cuyahoga, and State of Ohio, have invented a new and useful Improvement in Methods of Producing Oils, of which the following is a specification, the principle of the invention being herein explained and the best mode in which I have contemplated applying that principle, so as to distinguish it from other inventions.

My invention relates to a process of producing oils which can be used as a substitute for linseed-oil.

Heretofore it has been almost universally recognized that a substitute for linseed-oil should contain resin in order that the proper specific gravity and the gloss necessary to finished work in painting might be obtained; but the use of resin has proved impracticable, inasmuch as it results in the curdling of the lead, due to the formation of a viscid cheesy salt by the chemical union of basic lead carbonate, which is a constituent of white lead, and the anhydrate of abietic acid, which is the principal constituent of resin. My process, as hereinafter described, provides an efficient and satisfactory method of preventing the aforesaid curdling of the lead.

In my process I boil three thousand two hundred pounds of resin, any grade of which may be used, but that grade known as "K" being preferred, in two hundred and fifty-six pounds concentrated sulfuric acid, boiling the mixture until the chemical reaction between the acid and the constituents of the resin is complete, as shown by the fact that the mixture ceases to foam. By this boiling of sulfuric acid and resin a sulfonic acid is formed from the abietic acid in the resin, the lead salt of which sulfonic acid is not of the curdy nature of the lead salt of abietic acid, but of a nature that mixes readily and forms a drying-oil that, while its cost of manufacture is much less than that of linseed-oil, serves as a sufficient substitute for that oil. I then mix with the above amount of resin and sulfuric acid six hundred gallons of refined mineral oil, second-grade illuminating-oil preferred, in order to thin the mixture down to a consistency where its use will be practicable in the manufacturing of paint, painting, grinding white lead, or in any other way in which linseed-oil is used for painting and other purposes.

The variety of oil intended to be covered by the phrase "second-grade illuminating-oil" is as follows: In the distillation of crude oil four main products are obtained—naphtha, water-white 150 oil, tops, and bottoms. The water white is the heart of the oil and is used for illuminating purposes. Some of the distillate is not heavy enough to go into the water-white, and some is too heavy. These latter two portions are called "tops" and "bottoms." The first distillate, which is not even as heavy as the tops, is the naphtha. The tops and bottoms are mixed with more crude oil and distilled again. The first distillate is again naphtha. All that comes off after the naphtha down to as heavy a distillate as possesses fair illuminating properties is known as "second-grade illuminating-oil," or in the Pennsylvania fields "prime white 150 oil."

Other modes of applying the principle of my invention may be employed instead of the one explained, change being made as regards the process herein disclosed, provided the means stated by any one of the following claims or the equivalent of such stated means be employed.

I therefore particularly point out and distinctly claim as my invention—

1. A method of producing a substitute for linseed-oil, consisting of: first, boiling resin in concentrated sulfuric acid until the mixture ceases to foam, by which sulfonic acids of the constituents of resin are formed, whose lead salts are not of a curdy nature, and secondly, thinning down with a refined illuminating-oil.

2. A method of producing a substitute for linseed-oil, consisting of: first, boiling resin in sulfuric acid until the mixture ceases to foam, by which sulfonic acids of the constituents of resin are formed, whose lead salts are not of a curdy nature, and secondly, thinning down with refined second-grade illuminating-oil.

3. A composition of matter, consisting of substantially one-half refined petroleum-oil, and one-half abietic sulfonic acid and the sulfonic acids of other constituents of resin.

4. A substitute for linseed-oil, consisting of a mixture of substantially equal parts of refined petroleum-oil and the sulfonic derivatives of the constituents of resin.

5. A substitute for linseed-oil, consisting of a mixture of substantially one-half abietic sulfonic acid and other chemical products formed when resin is boiled in sulfuric acid, and one-half some lighter oil.

6. A substitute for linseed-oil, consisting of a mixture of substantially equal parts of refined second-grade illuminating-oil, and the chemical products formed when resin is boiled in sulfuric acid.

7. A substitute for linseed-oil, which has the same gravity as linseed-oil, consisting of a mixture of substantially equal parts of refined second-grade illuminating-oil, and the chemical products formed when resin is boiled in concentrated sulfuric acid.

Signed by me this 21st day of October, 1901.

WILLIAM A. SMITH.

Attest:
D. T. DAVIES,
A. E. MERKEL.